United States Patent [19]
Solomou

[11] Patent Number: 5,205,068
[45] Date of Patent: Apr. 27, 1993

[54] METHOD FOR CULTIVATION OF TURF

[76] Inventor: Christopher J. Solomou, 3 Smiths Lane, East Maitland, New South Wales 2323, Australia

[21] Appl. No.: 671,389

[22] Filed: Mar. 19, 1991

[30] Foreign Application Priority Data

Mar. 20, 1990 [AU] Australia .................................. 9201

[51] Int. Cl.⁵ .............................................. A01G 1/00
[52] U.S. Cl. ............................................ 47/56; 47/58; 47/9
[58] Field of Search .............................. 47/56, 58, 9 S

[56] References Cited

U.S. PATENT DOCUMENTS

| | | | |
|---|---|---|---|
| 3,845,584 | 11/1974 | Mercer | 47/56 |
| 3,863,388 | 2/1975 | Loads | 47/56 |
| 3,890,739 | 6/1975 | Blackburn | 47/56 |
| 4,023,506 | 5/1977 | Robey | 47/58 |
| 4,716,679 | 1/1988 | Heard | 47/56 |
| 4,916,855 | 4/1990 | Halliday et al. | 47/58 |
| 4,934,094 | 6/1990 | Walton | 47/56 |
| 4,982,526 | 1/1991 | Miyachi | 47/56 |

FOREIGN PATENT DOCUMENTS 2444436  3/1976  Fed. Rep. of Germany .......... 47/56

Primary Examiner—Richard E. Chilcot, Jr.
Assistant Examiner—Robert Canfield
Attorney, Agent, or Firm—Ladas & Parry

[57] ABSTRACT

A method of cultivating turf involving use of a first base of close mesh material such as hessian, cotton or synthetic material or a cotton/synthetic mix molded plastics material or knitted, woven or welded plastics such as polyolefin monofilament. Beneath the first base is disposed a second material layer, the material of this second layer being such as to allow roots to grow therethrough and, at harvest, to be withdrawn therethrough. Materials suitable for the second layer include soft textured continuouss materials such as spun polyester or knitted or woven plastics materials. Beneath the second material layer is a sand or sand/aggregate bed which is supported on a perforated plastics sheet. Seeds mixed in a pulp material are disposed on the first base, watered, grown to harvest, and the turf removed with the first base, the second material remaining for re-use.

11 Claims, 1 Drawing Sheet

METHOD FOR CULTIVATION OF TURF

This invention is concerned with turf cultivation and more particularly with the cultivation of turf so that the same might be transferred from the cultivation site to the site of permanent location in a lightweight, soil free manner.

Conventional turf farms seed or use runners of various grasses in good quality soil, water and feed the same until the grass has grown sufficiently to be removed to a site where the same might form the basis for a lawn, and rolled in comparatively heavy soil bearing rolls, the roots of the cultivated grass seeds or runners being contained within the soil. This method of growing and transplanting turf has its obvious disadvantages in that soil must be of good quality, is comparatively expensive and is delivered to the end consumer with the grass growing therein.

There is clearly a need for a method of providing turf to an end consumer in a more cost efficient manner than the conventional method specified above.

It has been proposed to cultivate turf in a soil free condition by providing a base tray which is impervious to water, locating over that base tray a mesh arrangement of hessian, molded plastic or the like, disposing seeds on that mesh and providing liquid nutrient to the arrangement until such time as the seeds sprout and the roots of the grass in question entwine with the mesh. This method certainly solves the problem of utilization of soil as a culture medium but has its disadvantages in that sale and transportation of the product must be effected at the appropriate harvest time, the time factor being critical, since mowing of the grass so propagated will be impossible without physically ripping the grass from its entwinement with the mesh or ripping up both grass and mesh. Further, waterlogging of the roots of the growing grass with the possible consequence of root diseases, may well flow from the use of a liquid impermeable base.

It is an object of this invention to provide an improved method for cultivation of turf.

This invention in one broad form provides a method for cultivation of turf comprising the steps of (a) providing a close mesh base;
(b) providing a base support of sand or a sand/aggregate mix;
(c) supporting said sand or sand/aggregate mix on a plastic sheet, introducing grass seeds to said mesh and utilizing a moistening spray over said seeds in order that said seeds might sprout and said grass might propagate.

It is preferred that the plastic sheet is perforated to permit egress of water therethrough although a trench to collect waste water may be placed under an unperforated plastic sheet if desired.

In the most preferred form of this invention a further material layer is disposed directly beneath the aforesaid mesh layer. This further layer is preferably of BIDUM, a spun polyester continuous fiber material manufactured by GEOFAB Limited of Sydney, Australia, although any like material of texture softer than that of the mesh material and preferably of continuous fiber will suffice through which the grass roots may penetrate during growth and may be withdrawn at harvest will suffice. At harvest the mesh, together with the mulch and turf are removed, but the BIDUM or other preferably continuous soft fabric layer remains for re-use. Alternative to BIDUM could be woven or knitted material such as RHEEM shade mesh woven or RHEEM shade mesh knitted.

Both materials have enough flexibility to allow withdrawal of roots through them for the purposes of cleaning off the roots.

A solid, welded or rigidly woven material would not be suitable in place of BIDUM as the roots and aggregate would tend to bind up or clog up upon withdrawal and break many of the roots off.

In the event that a woven or knitted material is used for both the mesh layer and the cleaning layer, it is preferred to use a smaller mesh size for the top layer, 1 mm or less, with the mesh size for the bottom layer suited to the aggregate that is to be substantially left behind after removal of the harvested turf. The BIDUM or other soft fabric layer effectively removes the sand or sand/aggregate mix from the roots as they are withdrawn therethrough, thus dispensing with the need for an expensive vibrating tray or other machinery to free the roots of the growing medium. The BIDUM most preferred is light grade designated BIDUM U14 or A14 and is of density $140\pm40$ gns/m$^2$, having a thread or filament of 5.6 Decitex.

It is preferred that before said seed is introduced to said mesh, said seed is mixed with paper pulp material or indeed any pulp materials such as pine bark or sawdust. Begas, a biproduct of sugar cane may also be mixed with the paper pulp material. Indeed, the pulp material may be replaced by suitable sludge material with which the seeds are mixed. The pulp material is preferably utilized on the order of five to ten kilos per acre of seed although up to 120 kilos per acre of seed may be used, depending on the fineness of the seed.

In the preferred form of this invention, a layer of approximately four to eight millimeters of seed/pulp combination might be placed on the mesh arrangement which will be of hessian, cotton or synthetic material or a mixture thereof, of molded plastic material such as is sold under the registered trade mark SARLON or shade mesh material such as is manufactured and marketed by RHEEM AUSTRALIA LTD. Such RHEEM material encompasses knitted, woven or welded polyolefin monofilament in various mesh sizes and strength. Where hessian is used, the preferred fabric is 10 oz. or heavier although 7 oz. hessian is useful in some applications. The mesh size might be up to 3 mm although 1 mm or less is preferred. If cloth fabric is used, the same might be of cotton, synthetic or a cotton/synthetic weave. The criterion for such fabric is that it possesses sufficient tensile strength to desist from tearing at the time of harvest. The mesh size of such fabric should be 1 mm or less, the closer mesh effectively preventing any pulp or seed from adhering to the lower soft layer of BIDUM or substitute material at the time of harvest. The pulp material and seed should be mixed in moist conditions and sprayed onto the aforesaid mesh, although seed and sawdust may be introduced to the mesh in dry form.

The sand or sand/aggregate mix should be coarse grained since fine grained sands are too readily prone to waterlogging. Further, it is more difficult to detach the roots of the propagated grass from the sand should the same be of fine grain. In the event that a sand/aggregate mix is utilized, the aggregate should have particle size of four to eight millimeters, should be inert and should be non-calcined.

The base sheet of plastics material might be selectively perforated to allow egress of water from the arrangement. Clearly, it is important to prevent waterlogging of the roots as they extend into the sand or sand/aggregate mix.

The base could be of an impervious material such as concrete or bitumen if drainage is adequate.

It will be appreciated that once the grass has grown to the required level, the hessian or SARLON mesh may be lifted from the sand or sand/aggregate into which the grass roots have extended, and the sand or sand/aggregate mix shaken and/or a jet or jets of compressed air or water used to remove growing medium from the grass roots. The sand or sand/aggregate mix may be reused and the turf transported in lightweight manner with the roots thereof entwined with the mesh and also extending therebelow.

With intense cultivation salt build-up could be a problem, and the sand/aggregate mix could be flushed with water to lower its salt level.

The Ph level could also change to an undesirable level, most likely towards acid Ph. Methods used for conventional turf farms to change Ph could be used such as spreading lime or a Ph adjuster such as Potassium Hydroxide could be introduced through the watering system.

Further, should the turf mature to such an extent that mowing is necessary before the same can be transported to an end user, this mowing might be effected without any fear of ripping the grass from the mesh, since the roots of the growing grass are to some extent anchored in the sand or sand/aggregate mix supported on the perforated plastics base.

It will also be appreciated that a binder may be used with the pulp material with which the seed is mixed in order that a higher germination rate might result. The method of this invention will provide vigorous growth and a desirable end product is assured.

By way of example certain embodiments of this invention will now be described with reference to the accompanying drawings wherein.

Figure 1:
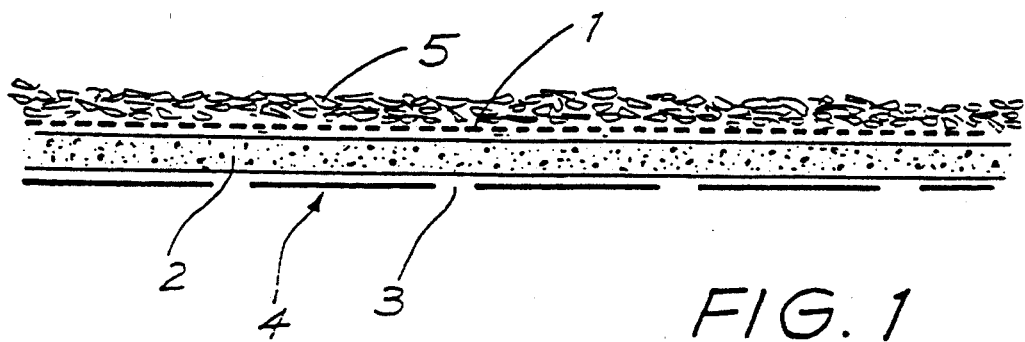
FIG. 1 is a section of an apparatus useful in one form of this invention.

In the drawings, hessian or SARLON mesh layer 1 is provided for the introduction thereto of seeds or seeds mixed with paper pulp, sawdust or like material 5. A binder might also be included in the mixture of seed and pulp. The mixture is moistened when introduced to mesh layer 1. Mesh layer 1 is supported on sand or sand/aggregate mix 2, the sand being coarse grained and the particle size of any aggregate ranging from four to eight millimeters.

Apertures 3 are provided in base plastic sheet 4 in order to allow egress therethrough of water which filters through sand or sand/aggregate mix layer 2 when the arrangement, with seed added 5 thereto, is watered.

Figure 2:
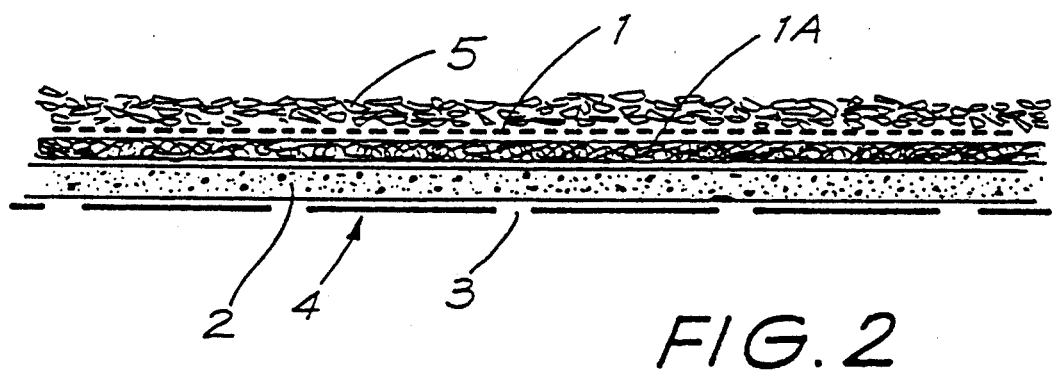
FIG. 2 is a section of apparatus useful in a further form of this invention.

FIG. 2 differs from FIG. 1 by the addition of the preferred BIDUM layer 1A.

Runners of a grass variety which is non-seeding or a variety difficult to obtain seed for can be dispersed on the meshed layer and lightly covered with a material such as a pulp or sawdust. This method takes longer than seeding to obtain good coverage but as with seeding the crop can be harvested much sooner than with soil culture because the root system is held together by the mesh layer.

What I claim is:

1. A method for cultivation of turf comprising the steps of:
    a) providing a close mesh base;
    b) providing under said close mesh base a support of sand or a sand/aggregate mix;
    c) supporting said sand or sand/aggregate mix on a plastics sheet, introducing grass seeds to said mesh and utilizing a moistening spray over said seeds in order that said seeds might sprout into grass, and said grass may propagate with roots of said propagated grass extending through said close mesh base and into said sand or sand/aggregate mix; and
    d) lifting the mesh base with the propagated grass extending therethrough from the sand or sand/aggregate mix, thereby removing said roots from the sand or sand/aggregate mix.

2. A method as defined in claim 1 including the further step of disposing between said close mesh base and said base support a further material layer through which grass roots may extend and be withdrawn.

3. A method as defined in claim 2 wherein said further material layer is of a soft textured material of continuous fiber.

4. A method as defined in claim 3 wherein said further material layer is of spun polyester.

5. A method as defined in claim 2 wherein said close mesh base is of hessian, cotton or synthetic material or a cotton/synthetic mix, molded plastics material or knitted, woven or welded polyolefin monofilament.

6. A method as defined in claim 2 wherein said seed, when deposited on said close mesh base is mixed with pulp material.

7. A method as defined in claim 6 wherein said pulp material is selected from paper pulp, pine bark, sawdust, shredded sugar cane or a combination of any one or more thereof.

8. A method as defined in claim 2 wherein said further material layer is of knitted or woven plastics material.

9. A method as defined in claim 2 wherein said seed, when deposited on said close mesh base is mixed with sludge.

10. A method as defined in claim 2 wherein said sand or sand/aggregate mix is coarse grained.

11. A method as defined in claim 2 wherein said plastics material is perforated to allow egress of water.

* * * * *